United States Patent [19]
Werling, Sr.

[11] 3,826,564
[45] July 30, 1974

[54] EYE GLASS FRAME FOR REPLACEABLE LENSES

[76] Inventor: Francis D. Werling, Sr., c/o George Spector 3615 Building 233 Broadway, New York, N.Y.

[22] Filed: Sept. 25, 1972

[21] Appl. No.: 292,269

Related U.S. Application Data

[63] Continuation-in-part of Ser. No. 85,915, Nov. 2, 1970, abandoned.

[52] U.S. Cl.................... 351/45, 351/98, 351/154, 351/165
[51] Int. Cl........................ G02c 7/10, G02c 1/08
[58] Field of Search ......... 351/164, 165, 44, 45, 61, 351/92, 96, 98, 154

[56] References Cited
UNITED STATES PATENTS

| | | | |
|---|---|---|---|
| 319,153 | 6/1885 | Wells | 351/172 |
| 2,276,102 | 3/1942 | Schwartz | 351/86 |
| 2,479,754 | 8/1949 | Marks | 351/98 X |
| 2,535,321 | 12/1950 | Rooney | 351/92 |
| 2,594,395 | 4/1952 | Castelli | 351/92 X |

FOREIGN PATENTS OR APPLICATIONS

| | | | |
|---|---|---|---|
| 10,526 | 0/1885 | Great Britain | 351/168 |
| 395,127 | 7/1933 | Great Britain | 350/213 |

*Primary Examiner*—David H. Rubin

[57] ABSTRACT

An improved pair of eye glasses in which each lens rim opening of the eye glass frame has a removable upper and lower lens for interchange with other clear or tinted lenses, the present invention including a latch that automatically locks the upper lens from dropping out accidently when the lens frame is opened during lens interchanging operation.

2 Claims, 4 Drawing Figures

PATENTED JUL 30 1974                    3,826,564
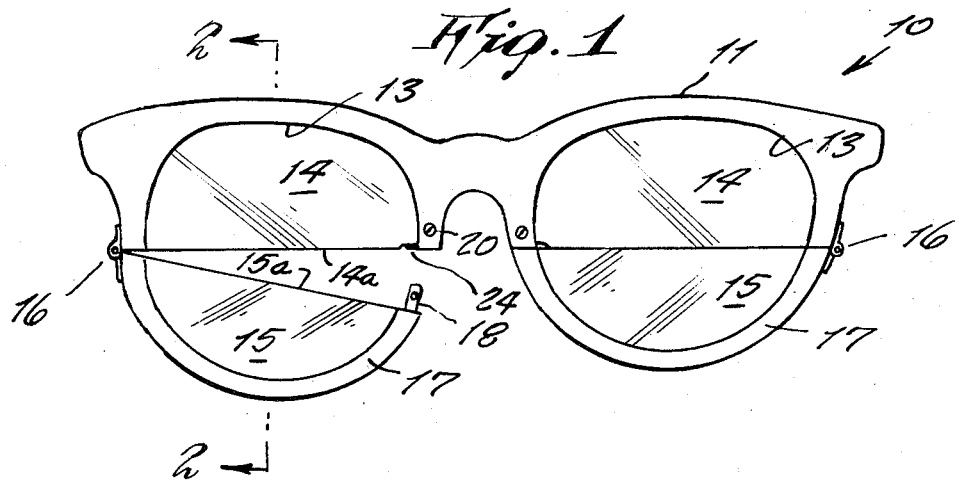
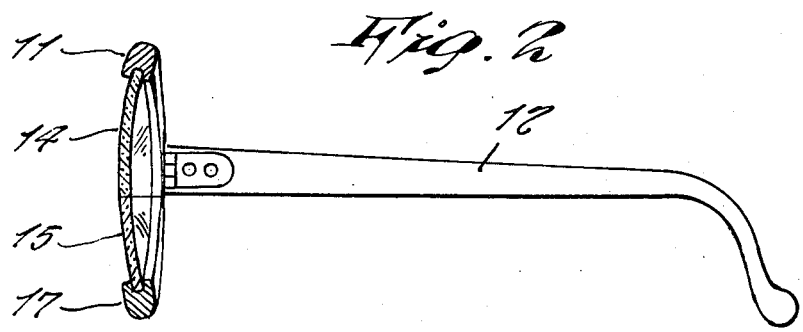
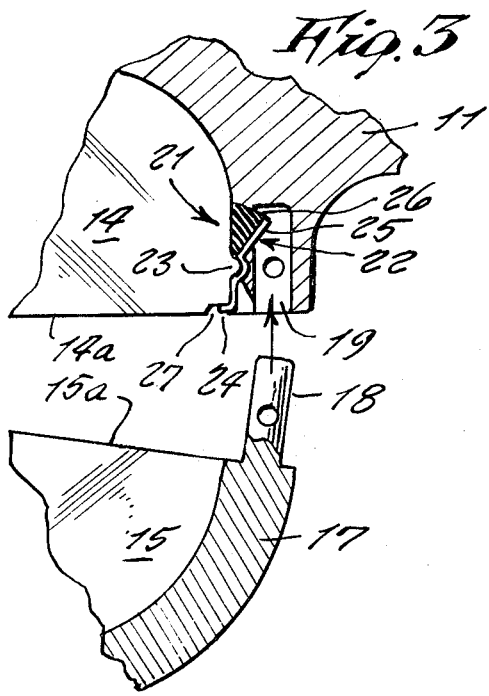
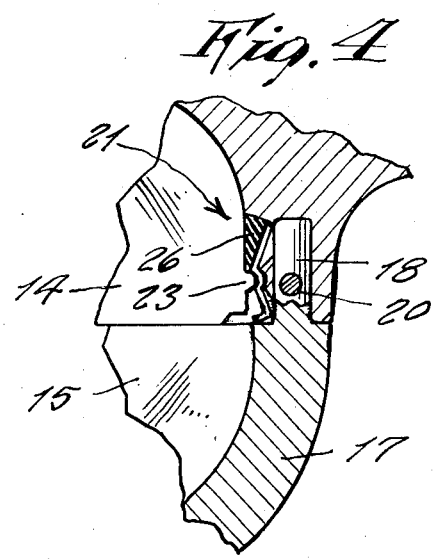

EYE GLASS FRAME FOR REPLACEABLE LENSES

This invention relates generally to eyeglasses. More specifically it relates to a continuation in part of applicant's U.S. Pat. application FOUR REMOVABLE PRESCRIPTION LENS TINTED OR CLEAR, Ser. No. 85,915, filed Nov. 2, 1970. The parent application has become abandoned.

A principal object of the present invention is to provide prescription eye glasses of the type described in applicant's previous application and which is further improved by incorporating a means to prevent the lens portion from accidently falling out of the frame when the lens frame is opened up during lens changing, thus preventing the danger of breaking lenses.

Another object is to provide prescription eye glasses in which a latch automatically moves to hold the upper lens from dropping downward out of the lens frame when the lens frame is opened.

FIG. 1 is a front view of the invention shown with one lens frame opened during a lens changing operation.

FIG. 2 is a cross section taken on line 2—2 of FIG. 1, and showing the lens frame in closed position.

FIG. 3 is an enlarged cross sectional view taken in the same plane as FIG. 1 and showing the latching mechanism holding the upper lens when the lens frame is open.

FIG. 4 is a similar view thereof and shown with the lens frame in a closed position.

Referring now to the drawing in detail, the reference numeral 10 represents prescription eye glasses according to the present invention in which there is an eyeglasses front frame 11 and hinged temple bows 12. The frame 11 has a pair of lens frame openings 13 in each of which an upper lens 14 and a lower lens 15 are supported with edges 14a and 15a abutting each other. Either of the lenses may be interchangable with others of the same size and shape so that either can be clear or tinted as desired.

In order that the lenses may be replaced, the lens frame openings 13 can be opened by means of a hinge 16 that supports one end of member 17. The other end of member 17 includes a peg 18 receivable into a hole 19 of the frame, and is secured in closed position by screw 20.

In the present invention, in order to prevent the upper lens 14 from accidentally dropping out of the frame when the lens frame is opened, a latch mechanism 21 automatically moves under the lower edge of the lens 14.

The mechanism 21 includes a lever 22 having an arcuate shape at its center that fulcrums on a generally semi circular protrusion 23 formed on the edge of the lens 14. The end 24 of one leg of the lever is at a right angle to the leg to form a hook for moving under the lens bottom edge. The other, upward leg 25 of the lever is normally urged pivotally away from a side edge of the lens 14 by a rubber cushion 26 therebetween. When the peg 18 is in the hole 19 it pushes the leg 25 of the lever 22 so that it is pivoted around protrusion 23, thus removing the hook end 24 away from under the lens 14. However, when the peg 18 is pulled out of the hole 19, the lever pivots due to the force of the rubber cushion against leg 23 thus causing the hook end to move under the lower edge of the lens 14 to hold it from dropping out. When the member 17 is pivoted fully open, the lens 14 can then be removed intentionally. A notch 27 on the edge 14a serves to receive the hook end 24 when the edges 14a and 15a are in abutment with each other.

Thus improved prescription eyeglasses are provided.

While various changes may be made in the detail construction, it is understood that such changes will be within the spirit and scope of the present invention as is defined by the appended claims.

I claim as follows:

1. In an improved eye glass frame for removable prescription lens tinted or clear, the combination of an eyeglass assembly consisting of a front frame attached pivotally to a pair of temple bows, a pair of arcuate rims encompassing lens openings in said frame, removable upper and lower abutting lenses in each said opening, said lenses being interchangable with other like shape and size lenses so that said lenses in said frame openings are selectively either clear or tinted, including means for opening each rim for lens replacement comprising an arcuate member forming a lower edge of said rim, one end of said member being hinged to said frame and the other end of said member having a peg receivable in a hole in said frame and secured by a screw wherein the lower lens is removably mounted in the said lower edge and the upper lens is removably mounted in the frame and supported by the lower lens when the rim is in the closed position, including a latch pivoted on the frame adjacent the hole and having a portion positioned in said hole for engagement by said peg, with resilient means on the frame biasing the latch to a position engaging the upper lens when the rim is open, whereby the upper lens is restrained from falling out of the frame.

2. The combination as set forth in claim 1 wherein the latch comprises a lever with a lower leg and an upper leg pivotally mounted therebetween, the resilient means comprising a rubber cushion biasing the upper leg towards the lens retaining position, said lower leg having a hook for engaging a lower edge of the upper lens, the upper leg of said lever being so disposed that insertion of the peg in the hole forces the upper leg to compress the cushion, thereby releasing the hook from the lower edge of the upper lens.

* * * * *